April 1, 1958
J. R. FOLEY
2,828,941
BLADE DAMPING MEANS
Filed Dec. 24, 1952
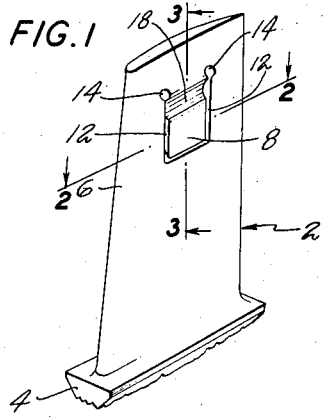
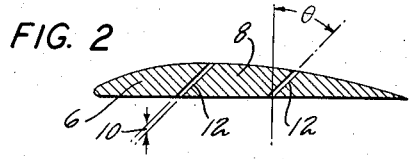
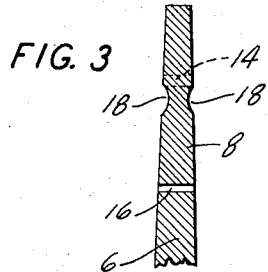
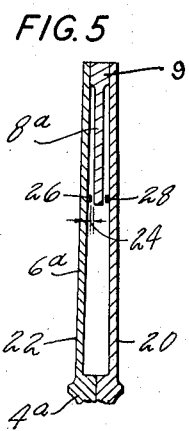
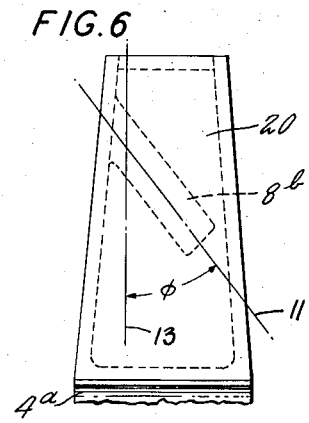
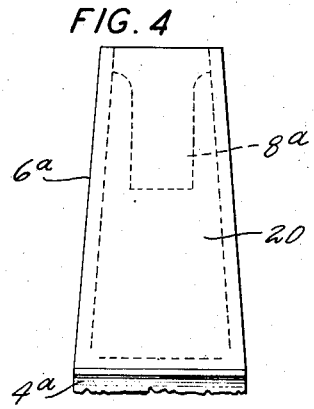
INVENTOR
JOHN R. FOLEY
BY Jack N. McCarthy
AGENT

United States Patent Office 2,828,941
Patented Apr. 1, 1958

2,828,941
BLADE DAMPING MEANS

John R. Foley, Manchester, Conn., assignor to United Aircraft Corporation, East Hartford, Conn., a corporation of Delaware Application December 24, 1952, Serial No. 327,854

5 Claims. (Cl. 253—77)

This invention relates to blade damping means for blades or vanes as used in compressors or turbines or other aerodynamic devices such as fans or propellers.

An object of this invention is to provide a dynamic vibration absorber for blades consisting of a tab rigidly fixed at one end to a blade.

Another object of this invention is to provide a vibration damping means which is applicable to both solid and hollow blades.

A further object is to provide a vibration damping means which will reduce the excessive stress that a conventional blade assumes while passing through resonance.

Another object is to provide a vibration damping means which may be used with a blade of practically any outside configuration (i. e. such as twisted, tapered or having an airfoil cross section).

Other objects and advantages will be apparent from the specification and claims and from the accompanying drawings which illustrate the invention.

Fig. 1 is a perspective view of a solid blade embodying one form of the invention.

Fig. 2 is a sectional view on the line 2—2 of Fig. 1.

Fig. 3 is a sectional view on the line 3—3 of Fig. 1.

Fig. 4 is a fragmentary side elevation of a hollow blade embodying a modification of the invention therefor having a tab extending directly downwardly.

Fig. 5 is a sectional view on the line 5—5 of Fig. 4.

Fig. 6 is a fragmentary side elevation of a hollow blade embodying a modification of the invention therefor having a tab extending at an angle to the longitudinal axis of the blade.

With reference to Fig. 1, the blade 2 has a root portion 4, partially broken away, which may be one of many root shapes which fits in a similarly shaped slot in a rotor disk. The effective blade section or body portion or part 6 of the turbine blade is supported by and extends radially outwardly from the root and is solid. The blade section 6, as shown in Fig. 2, is approximately airfoil in shape chordwise of the blade.

In accordance with the invention, a small cantilever tab or tab part 8 is formed in the body portion. One method of forming a tab is as follows: two parallel side cuts 12 are made each from a drilled hole 14 to form parallel slots defining the sides of the tab. A bottom cut 16 is made connecting the adjacent ends of the side cuts 12 remote from the drilled holes 14 thereby forming a slot defining the free end of the tab. The parallel slots and the connecting slot together constitute a U-shaped slot that defines the shape of the tab, the U-shaped slot having a base and parallel legs extending from opposite ends of the base. However, the tab may be formed by any other means desired. The blade has a vibratory motion in a direction substantially at right angles to the chordwise dimension of the blade and the tab also has a vibratory motion about an axis that lies approximately in the plane of the blade. In the arrangement of Figs. 1 to 3, the vibratory axis of the tab is substantially parallel to the chord of the blade. The size of the tab is determined from the following two conditions: (1) the natural frequency of the tab should approximately equal the natural frequency of the original blade, when rotating, and (2) the tab should be large enough to absorb the stresses without failure. The tab is approximately equal in thickness to the adjacent portions of the blade structure.

To illustrate this, assume the blade to be a flat plate of length (L), width (B) and thickness (T), supported on a disk of radius (R) and rotating at a speed (N). The blade frequency can then be determined by the following formula:

$$\text{Blade frequency} = \sqrt{\frac{12.4T^2E}{12L^4\gamma} + N^2\left(2\frac{R}{L} + \frac{4}{3}\right)}$$

In the above formula E is Young's modulus and $\gamma$ is the density of the blade material. Similarly, the frequency of a tab can be determined by the following formula:

$$\text{Tab frequency} = \sqrt{\frac{12.4t^2E}{12l^4\gamma} + N^2\left(2\frac{r\cos\phi}{l} + \frac{4}{3}\right)}$$

In this formula for tab frequency the tab has a length ($l$), width ($b$) and thickness ($t$), a radius ($r$) to the root of the tab and an angle ($\phi$) between the tab axis and a radial line. This angle $\phi$ is a zero when the tab is pointing directly outward in a radial direction. From this it can be seen that the dimensions of the tab may be selected to give the desired frequency in accordance with the above relations. It is to be noted that the angle ($\phi$) of the tab axis is very important in controlling the tab frequency. The tab may also be undercut such as at 18 to further control its frequency.

The stress in the tab may then be calculated from the following formula:

$$\text{Tab stress} = \text{blade stress} \times 1.6 \frac{B\left(\frac{L}{l}\right)^{8/3}}{b\left(\frac{L}{l} - 1\right)}$$

where "blade stress" is the static stress of the original blade under the applied load. Thus, the dimensions selected above may be checked and if the stress is excessive a different combination of tab dimensions can be tried.

A tab clearance is selected to limit the maximum displacement of the tab relative to the blade during "off speed" operation. There are two speeds, on either side of the speed at which the original blade was resonant, at which the amplitude of the blade with a tab is theoretically infinite. Therefore, stops must be arranged which limit the stress on the tab and blade. The clearance between the tab and stops may be figured by the following formula:

$$\text{Clearance} = \text{maximum allowable tab stress} \times \frac{l^2}{1.5Et}$$

The tab stress is chosen to set the clearance since in most practical cases it is greater than the blade stress. As stated above the example described is for a particular blade form, however, the same procedure holds for actual blades of other configurations.

This clearance is shown in Fig. 2 for the solid blade section 6 by the reference numeral 10. This clearance can be accomplished in the solid blade section 6 by making the cuts 12 in the blade diagonally through said section at an acute angle $\theta$ to the direction of vibratory motion of said blade. The clearance 10 having been figured it can be accurately formed between the tab and blade by making the width of the cut equal to the clearance times the sine of the cut angle $\theta$. However, if it is desired to make the saw cut straight through the blade, an external stop can be placed on either side of the blade, or some other stop means used. The clearance would remain the same in all cases.

In the actual manufacture of aircraft engines the blades in the first stages of some compressors are made heavy because of the necessity of tuning their natural frequencies such that resonance will not occur in their operating range. A much lighter blade can be made using the invention herein disclosed since the blades only have to be designed to withstand the steady air loads and centrifugal loads.

In Figs. 4, 5 and 6 the invention is shown in use with a hollow blade. While a hollow blade may be formed in a number of different ways, for purpose of illustration these figures show the hollow blades formed by placing two halves 20 and 22 together. These halves are then fixed together such as by welding. This forms the blade section 6a and root section 4a. In Figs. 4 and 5 the tab 8a is mounted on a plug 9 at the tip of the blade and extends directly downwardly. This construction of the tab 8a with a hollow blade resembles closely the construction of Fig. 1 with a solid blade. The clearance is shown in Fig. 5 by the reference numeral 24. While this is shown between the tip of the tab and stops 26 and 28 fixed to the sides 22 and 20 respectively of the blade section 6a, it is to be understood that the sides of the blades themselves may be formed of such a thickness to act as stops. It is to be further noted that these stops may be located at other points along the length of the tab.

In Fig. 6 the tab 8b is mounted in a blade with its free end projecting within the blade at an angle ($\phi$) between the tab axis 11 and a radial line 13.

In mounting any of the tabs 8a or 8b the tab can be first fixed at one end to one half 22 of the blade section 6a, then when the other half 24, of the blade section is placed against 22 to form the blade, the tab is mounted therein. However, if the blade is formed in other ways the tab may be inserted and mounted in any manner desired, such as through an open blade tip.

Although specific blades have been shown and described herein for purpose of illustration, it will be evident to those skilled in the art that the invention is capable of various modifications and adaptations within the scope of the appended claims.

I claim:

1. A solid blade structure having a root section by which the blade is supported, and a body portion substantially airfoil-shape in cross section extending from said root, said body portion having a substantially U-shaped slot therethrough having substantially parallel leg portions, said slot forming a tab integral with the body portion and between the leg portions of the slot, said tab being spaced from the periphery of the body portion and enclosed thereby, the opposite surfaces of the tab being substantially in alignment with the adjacent surfaces of the body portion, the dimensions of the tab and blade structure being such that the natural frequency of vibration of the tab is approximately equal to that of the blade structure.

2. A blade structure including a blade element having a body part and a root portion by which the body part is supported, said body part having a U-shaped slot therethrough forming a tab part integral with the body part, and having the opposite surfaces thereof substantially in alignment with the adjacent surfaces of the body part, the dimensions of the tab part being such that its natural frequency of vibration is approximately equal to that of the blade structure, and stop means on one of said parts and in a position to engage the other part for limiting the extent to which said tab part can move in relation to said body part.

3. A blade structure having a root portion by which the blade is supported and a body portion substantially airfoil-shape in cross section extending from said root, said body portion having a vibratory motion substantially at right angles to the chord of the airfoil cross section, said body portion having a substantially U-shaped slot therethrough forming a tab integral with the body portion, said slot including a base and opposite substantially parallel legs extending from the base, the parallel legs of the slot extending through the blade portion at an acute angle to the direction of vibratory motion of the body portion, the dimensions of the tab and body portion being such that the natural frequency of vibration of the tab is approximately equal to that of the blade structure.

4. A blade structure having a body portion substantially airfoil-shape in cross section and a root portion at one end of the body portion by which the latter is supported, said body portion having a vibratory motion substantially at right angles to the chord of the airfoil cross section, said body portion having a substantially U-shaped slot therethrough forming a tab integral with the body portion and spaced from the periphery of the body portion, the dimensions of said tab being such that its natural frequency of vibration is approximately equal to that of the blade structure, and stop means on said body portion and engageable with the tab for limiting the extent to which said tab can move in relation to said body portion, said stop means being spaced from the normal position of said tab within the body portion to provide a clearance between said stop means and the cooperating portion of the tab equal to the $$\text{Maximum allowable tab stress} \times \frac{l^2}{1.5Et}$$

where:

$l$ = tab length
$t$ = tab thickness
$E$ = Young's modulus

5. A blade structure having a body portion substantially airfoil-shape in cross section and a root portion at one end of the body portion by which the latter is supported, said body portion having a vibratory motion substantially at right angles to the chord of the airfoil cross section, said body portion having a substantially U-shaped slot therethrough forming a tab integral with the body portion and spaced from the periphery of the body portion, and stop means on said body portion in a position to engage with the tab for limiting the extent to which said tab can move with respect to said body portion.

References Cited in the file of this patent

UNITED STATES PATENTS

| | | |
|---|---|---|
| 1,833,751 | Kimball | Nov. 24, 1931 |
| 2,397,132 | Dent | Mar. 26, 1946 |
| 2,412,615 | Howard | Dec. 17, 1946 |
| 2,642,263 | Thorp | June 16, 1953 |
| 2,643,853 | Redding | June 30, 1953 |
| 2,689,107 | Odegaard | Sept. 14, 1954 |

FOREIGN PATENTS

| | | |
|---|---|---|
| 127,459 | Switzerland | Sept. 1, 1928 |
| 981,599 | France | Jan. 17, 1951 |
| 1,024,218 | France | Jan. 7, 1953 |